US008526770B2

(12) United States Patent
Casasanta

(10) Patent No.: US 8,526,770 B2
(45) Date of Patent: Sep. 3, 2013

(54) SYSTEMS, MATERIALS, AND METHODS FOR A MECHANICAL STRESS ACTIVATED INTERFACE USING PIEZO-OPTICAL COMPONENTS

(75) Inventor: Vincenzo Casasanta, Woodinville, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/503,781

(22) PCT Filed: Jan. 30, 2012

(86) PCT No.: PCT/US2012/023124
§ 371 (c)(1),
(2), (4) Date: Apr. 24, 2012

(65) Prior Publication Data
US 2013/0195399 A1    Aug. 1, 2013

(51) Int. Cl.
*G02B 6/26* (2006.01)
(52) U.S. Cl.
USPC .............................................. 385/13; 385/129
(58) Field of Classification Search
None
See application file for complete search history.

(56) References Cited

U.S. PATENT DOCUMENTS

| | | | | |
|---|---|---|---|---|
| 4,428,234 A * | 1/1984 | Walker | | 73/514.27 |
| 4,480,182 A * | 10/1984 | Ely et al. | | 250/227.22 |
| 4,542,375 A * | 9/1985 | Alles et al. | | 345/176 |
| 4,609,816 A * | 9/1986 | Severin | | 250/227.14 |
| 4,634,858 A * | 1/1987 | Gerdt et al. | | 250/227.14 |
| 4,733,068 A * | 3/1988 | Thiele et al. | | 250/227.14 |
| 4,886,361 A * | 12/1989 | Furstenau | | 356/477 |
| 4,929,050 A * | 5/1990 | Wilson | | 250/227.17 |
| 6,492,980 B2 | 12/2002 | Sandbach | | |
| 6,538,644 B1 | 3/2003 | Muraoka | | |
| 6,763,154 B2 * | 7/2004 | MacDonald et al. | | 385/13 |
| 6,842,545 B2 | 1/2005 | Lackritz et al. | | |
| 2004/0067005 A1 * | 4/2004 | Miyazawa et al. | | 385/13 |

(Continued)

FOREIGN PATENT DOCUMENTS

| | | |
|---|---|---|
| CN | 101430449 A | 5/2009 |
| CN | 101952794 A | 1/2011 |

(Continued)

OTHER PUBLICATIONS

International Search Report and Written Opinion for PCT/US2012/023124 dated Mar. 16, 2012.

(Continued)

*Primary Examiner* — Michael Stahl
(74) *Attorney, Agent, or Firm* — Pepper Hamilton LLP

(57) ABSTRACT

A mechanical stress activated interface and system comprising piezo-optical elements is described. The piezo-optical elements are fabricated from waveguides each having a core surrounded by a cladding material. The waveguides are supported on a substrate, thereby forming a thin sheet. The interface may take advantage of ambient light for illumination. Activation of the cores, such as by a user pressing the interface, may result in changes to their indices of refraction. More ambient light will be conducted along the lengths of the cores under stressed conditions than under non-stressed conditions. The output at the ends of the piezo-optical elements may be detected by light receiving elements. The output of the light receiving elements may be used by electronics coupled to a computer to determine which waveguides have been stressed, thereby determining the location of the touch on the interface. Methods for fabricating and using the interface are also described.

26 Claims, 10 Drawing Sheets

(56) References Cited

U.S. PATENT DOCUMENTS

| | | |
|---|---|---|
| 2005/0201681 A1 | 9/2005 | Payne |
| 2006/0001653 A1 | 1/2006 | Smits |
| 2006/0023988 A1* | 2/2006 | Kurtz et al. ............... 385/12 |
| 2007/0235297 A1 | 10/2007 | Stoschek et al. |
| 2010/0156848 A1* | 6/2010 | Yatsuda et al. ............. 345/175 |
| 2011/0102705 A1 | 5/2011 | Miyazaki et al. |

FOREIGN PATENT DOCUMENTS

| | | |
|---|---|---|
| EP | 2254030 A1 | 11/2010 |
| JP | 56-021279 | 2/1981 |
| JP | 2001-147772 | 5/2001 |
| WO | WO2006/081633 A1 | 8/2006 |
| WO | WO2007/128039 A1 | 11/2007 |
| WO | WO2009/113330 A1 | 9/2009 |

OTHER PUBLICATIONS

Astin, Finger force capability: measurement and prediction using anthropometric and myoelectric measures, Thesis submitted to the Faculty of the Virginia Polytechnic Institute and State University, Dec. 16, 1999, pp. 1-103.

Fuks-Janczarek et al., Large photoelastic effect in modified fullerenes, *Journal of Modern Optics* (Nov. 23, 2001), 50(8):1277-1283.

Ganesan et al., Piezo-optical and electro-optical behavior of nematic liquid crystals dispersed in a ferroelectric copolymer matrix, *J Phys D: Appl Phys* (Aug. 18, 2009), pp. 1-6.

Gondek et al., UV-operated pyrazoloquinoline piezooptical materials, *Optical Materials* (Feb. 20, 2007), 30:939-945.

Kityk et al., Photoinduced effects in γ-glycine nanocrystallites embedded in polymer matrices, *Optics Communications* (Oct. 11, 2010), 284:1575-1577.

Nørstebø, Intelligent Textiles, Soft Products, Department of Product Design, NTNU, Norwegian University of Science and Technology (2007).

Qiu, Patterned piezo-, pyro-, and ferroelectricity of poled polymer electrets, *Journal of Applied Physics* (Jan. 29, 2010), 108:011101-1-011101-19.

Tkaczyk et al., UV-excited piezo-optical effects in oxide nanocrystals incorporated into PMMA matrices, *Acta Materialia* (Apr. 3, 2008), 56:5677-5684.

Fresnel equations, http://en.wikipedia.org/wiki/Fresnel-equations (printed from internet Aug. 3, 2011).

* cited by examiner

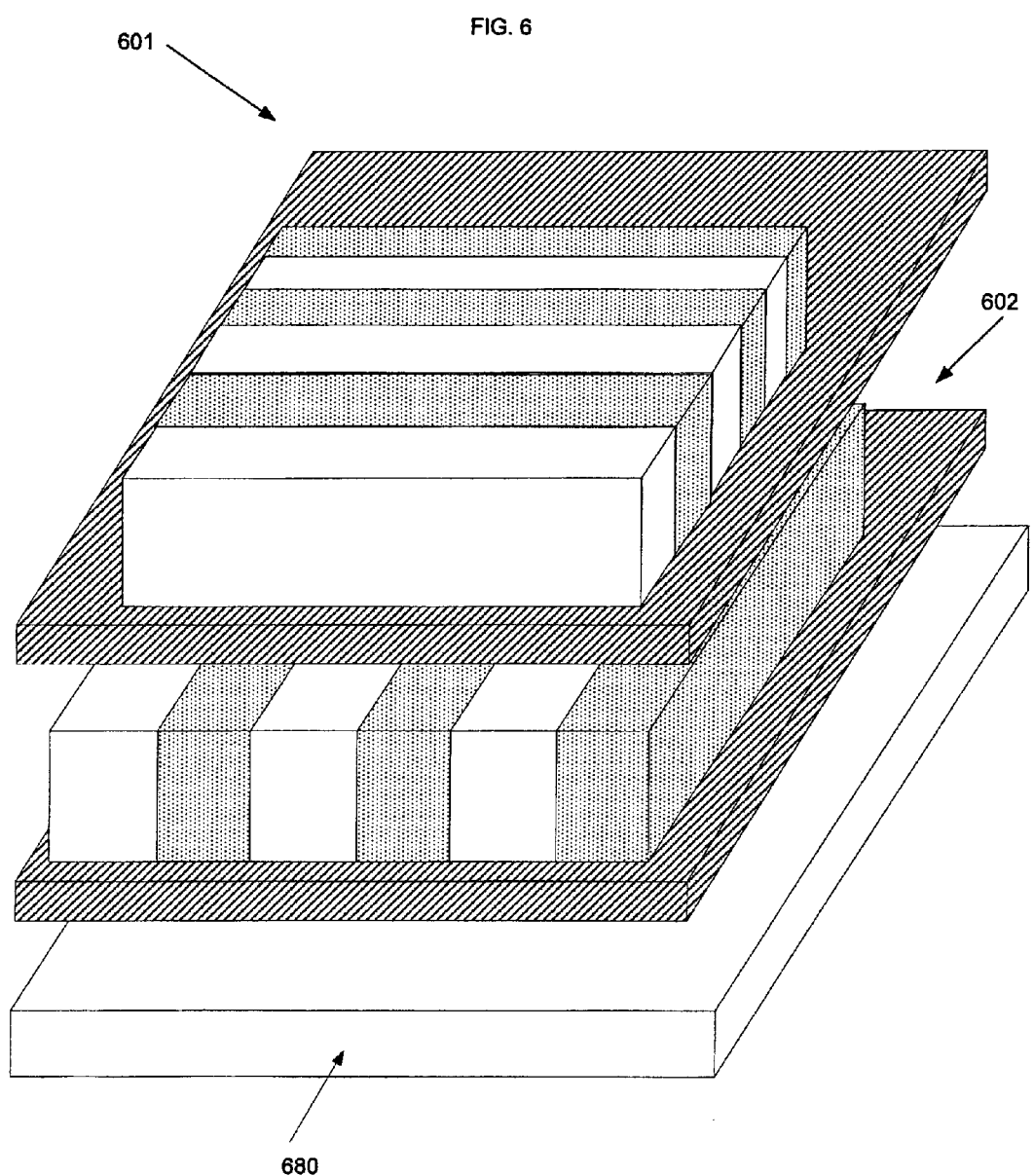

SYSTEMS, MATERIALS, AND METHODS FOR A MECHANICAL STRESS ACTIVATED INTERFACE USING PIEZO-OPTICAL COMPONENTS

CLAIM OF PRIORITY

This application is a U.S. national stage filing under 35 U.S.C. §371 of International Application No. PCT/US2012/023124 filed Jan. 30, 2012 entitled "Systems, Materials, and Methods for a Mechanical Stress Activated Interface Using Piezo-Optical Components," the disclosure of which is incorporated by reference in its entirety.

BACKGROUND

Mechanical stress activated, or touch screen, interfaces are found in a variety of applications including computers, cell phones, ATM machines, and in automotive applications. These interfaces incorporate a variety of touch transducer sensors including resistive, capacitive, and optical technologies.

Many of the sensor technologies require power both for generating a signal and for powering electronics to sense or measure a change in the signal when a touch is applied to the interface. In order to reduce device power requirements, especially for small hand-held battery-operated devices, it would be useful to develop a mechanical stress activated interface that may require power for the sensing electronics, but may not require power to generate the sensed interface signal.

Piezo-optical materials are those that change their index of refraction under stress. Ambient light that passes through an unstressed piezo-optical core may be trapped within the core when its refractive index is altered by the application of stress. Therefore, a mechanical stress activated interface using piezo-optical materials can take advantage of ambient light including room lighting or light generated by a computer monitor to generate a sensing signal. In this way, a piezo-optical-based interface may require less power to generate an activation signal, than other touch screen interfaces.

SUMMARY

In an embodiment, a mechanical stress activated interface device comprises a flexible substrate, a multiplicity of waveguides associated with the flexible substrate, in which each waveguide comprises a piezo-optical core having an unstressed index of refraction and a stressed index of refraction and a cladding component disposed against at least one side of the core and extending along its transverse length, and a multiplicity of light receiving elements, each light receiving element being optically coupled to at least an end of each one of the piezo-optical cores.

In an embodiment, a mechanical stress activated interface system comprises a flexible substrate, a multiplicity of waveguides associated with the flexible substrate, in which each waveguide comprises a piezo-optical core having an unstressed index of refraction and a stressed index of refraction and a cladding component disposed against at least one side of the core and extending along its transverse length, a multiplicity of light receiving elements, each providing an output, in which each light receiving element is optically coupled to at least an end of each one of the piezo-optical cores, and an electronic system in data communication with each light receiving element output.

In an embodiment, a mechanical stress activated interface system comprises at least a pair of mechanical stress activated interfaces, each interface having a flexible substrate, a multiplicity of waveguides associated with the flexible substrate, in which each waveguide comprises a piezo-optical core having an unstressed index of refraction and a stressed index of refraction and a cladding component disposed against at least one side of the core and extending along its transverse length, a multiplicity of light receiving elements, each providing an output, in which each light receiving element is optically coupled to at least an end of each one of the piezo-optical cores, in which the two mechanical stress activated interfaces are oriented at an angle with respect to each other, and further having an electronic system in data communication with the light receiving element outputs of the mechanical stress activated interfaces.

In another embodiment, a method of locating a mechanical stress applied to an interface system comprises providing a at least pair of mechanical stress activated interfaces, each interface having a flexible substrate, a multiplicity of waveguides associated with the flexible substrate, in which each waveguide comprises a piezo-optical core having an unstressed index of refraction and a stressed index of refraction and a cladding component disposed against at least one side of the core and extending along its transverse length, providing a multiplicity of light receiving elements, each having an output, each light receiving element being optically coupled to at least an end of each one of the piezo-optical cores, orienting the mechanical stress activated interfaces at an angle with respect to each other, providing an electronic system, having an electronic system output, in data communication with the light receiving element outputs of the mechanical stress activated interfaces, applying a stress input to the interface system, and detecting a change in at least one light receiving element output from at least one mechanical stress activated interface. Another embodiment of the method includes providing a communication system with the electronic system, and transmitting the electronic system output via the communication system to a receiving system. A further embodiment of the method includes computing a difference in a light receiving element output measured at two different times. An additional embodiment of the method may including computing a threshold difference between a light receiving element measurement and a threshold value.

In another embodiment, a method of fabricating a mechanical stress activated interface system comprises providing a first plurality of piezo-optical cores comprising a first piezo-optical material having an unstressed core index of refraction and a stressed core index of refraction, arranging the first plurality of piezo-optical cores into a first layer of piezo-optical cores in a manner in which no piezo-optical core contacts any other piezo-optical core, furnishing a first cladding component to the first layer of piezo-optical cores thereby forming a first piezo-optical waveguide layer, associating a first substrate layer comprising a first substrate material with the first piezo-optical waveguide layer thereby forming a first interface layer, and providing a first plurality of light receiving elements, in which each light receiving element of the first plurality of light receiving elements is optically coupled to at least an end of each one of the piezo-optical cores of the first plurality of piezo-optical cores, and each light receiving element of the first plurality of light receiving elements has a light receiving element output.

In an embodiment, a method of fabricating a mechanical stress activated interface system comprises providing a first interface layer, in which providing the first interface layer includes providing a first plurality of piezo-optical cores comprising a first piezo-optical material having an unstressed core index of refraction and a stressed core index of refraction, arranging the first plurality of piezo-optical cores into a first layer of piezo-optical cores in a manner in which no piezo-optical core contacts any other piezo-optical core, furnishing a first cladding component to the first layer of piezo-optical cores thereby forming a first piezo-optical waveguide layer, associating a first substrate layer comprising a first substrate material with the first piezo-optical waveguide layer, and providing a first plurality of light receiving elements, in which each light receiving element of the first plurality of light receiving elements is optically coupled to at least an end of each one of the piezo-optical cores of the first plurality of piezo-optical cores, and each light receiving element of the first plurality of light receiving elements has a light receiving element output, providing a second interface layer that is fabricated essentially in the same manner as the first interface layer using a second plurality of piezo-optical cores comprising a second piezo-optical material having an unstressed core index of refraction and a stressed core index of refraction, a second cladding component, a second substrate material, and a second plurality of light receiving elements with light receiving element outputs in which each of the second plurality of light receiving elements is optically coupled to at least an end of each one of the piezo-optical cores of the second plurality of piezo-optical cores, orienting the second interface layer at an angle with respect to the first interface layer; and associating the second interface layer with the first interface layer,

BRIEF DESCRIPTION OF THE DRAWINGS

FIG. 6 illustrates another embodiment of a two-layer, piezo-optical-based, stress-activated interface in accordance with the present disclosure.

DETAILED DESCRIPTION

Mechanical stress activated, or touch screen, interfaces provide an easy user interface for electronic applications in many areas. They can replace more cumbersome interface devices, such as a keyboard or mouse, especially for small hand-held devices and in applications in which space is largely unavailable. A touch screen overlaid on a display monitor associated with a computer may allow the user to touch an icon or other symbol viewed on the monitor thereby activating a computer application. Such an interface is also especially useful for a user having physical impairments, such as limited hand or finger mobility.

Several technologies are available for touch screen interfaces. Resistance-based touch screens have a pair of resistive deformable surfaces, each carrying a low-current electrical voltage, in which the point of contact between the surfaces connects the surface together to generate a unique analog voltage similar to that obtained from the wiper of a potentiometer. Capacitor-based touch screens measure the change in capacitance of a charged surface when a conductor such as a human finger is placed on the surface. By measuring the capacitance at the corners of the surface, the interface is able to locate the area being touched. Optical-based touch screens are also used. In one example, a surface is mounted in a frame containing opposing light emitters and receivers both in the vertical and horizontal directions. When a finger is placed on the surface, it interrupts the light generated by the emitter and prevents the corresponding receiver from being illuminated. In another optical system, light-conducting fibers conduct light from a source coupled at one end to a receiver coupled at the opposite end. A stress applied to a fiber compresses the fiber, thereby interrupting the light it conveys to the receiver. In each of these examples, power is needed to generate the touch activated signal.

The present disclosure is directed to a mechanical stress-activated interface and interface system, their method of use and fabrication that incorporates piezo-optical materials. A piezo-optical (or PO) material is one in which the index of refraction changes upon the application of stress to the material. When stress is applied to the PO material mounted on a substrate with a constant index of refraction, ambient light that may otherwise propagate through both the PO material and substrate may be reflected back into the PO material from the PO/substrate interface. In this manner, the light intensity conducted along a transverse axis of the PO material may increase upon the application of stress.

Figures 1A, 1B:
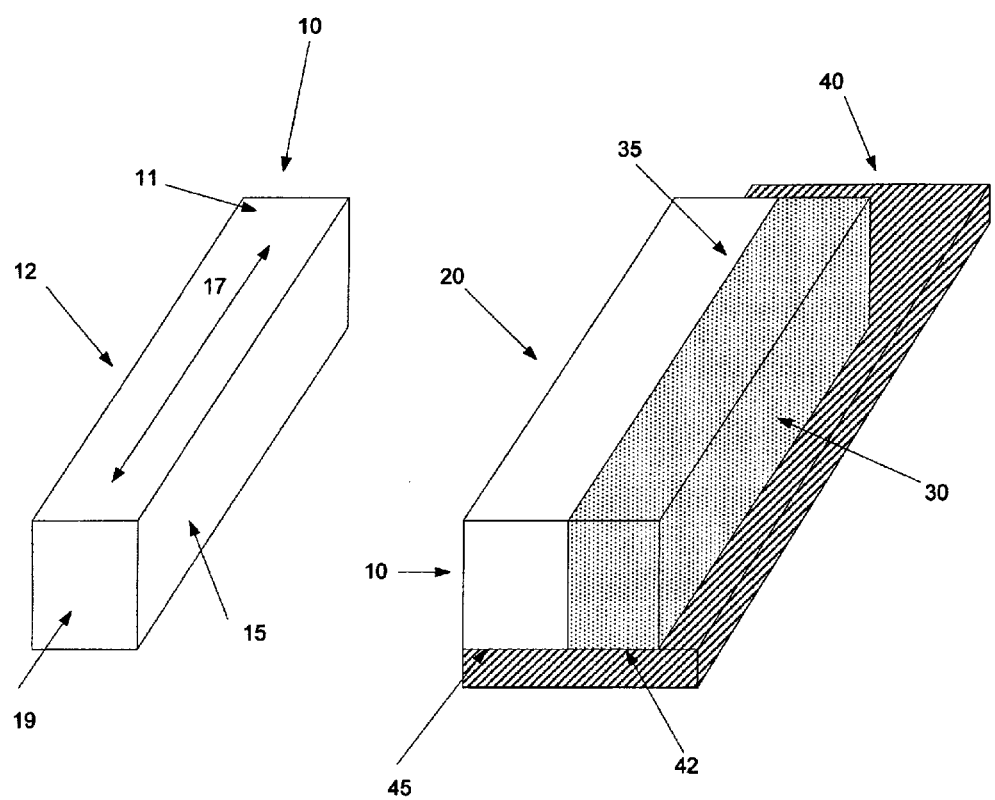
FIG. 1a illustrates a length of a piezo-optical core in accordance with the present disclosure.
FIG. 1b illustrates a waveguide associated with a flexible substrate in accordance with the present disclosure.

FIG. 1a illustrates an embodiment of a piezo-optical core (10). The core is shown having a roughly square cross-section and an extended length. However, it is understood that such geometry is for illustrative purposes only, and should not be taken as limiting. For the purpose of clarity, the core is illustrated as having at least a face (11), a pair of opposing sides (12 and 15), a transverse length (17) and at least one end (19).

The PO core may comprise an optically clear or translucent matrix with an embedded dopant. In some embodiments, the matrix comprises, as non-limiting examples, a ferroelectric copolymer matrix, a polyvinyl alcohol matrix, a poly(methyl methacrylate) matrix, a polycarbonate matrix, semi-crystalline poly(vinylidene fluoride), poly(vinylided fluoride) copolymer of trifluoroethylene, aromatic polyurea, alphatic polyurea, copolymers of vinylidene cyanide, odd-numbered polyamides, poly-L-lactic acid and/or copolymers of vinylidene fluoride and trifluoroethylene. In some embodiments, the dopant comprises, as non-limiting examples, liquid crystal phases, modified fullerenes, nanocrystals of lanthanide-doped monoclinic potassium double tungstates, nanocrystals of potassium neodymium phosphate, nanocrystals of potassium titanyl phosphate, gamma-glycine nanocrystals, pyrazoloquinoline compounds, and/or inorganic ferroelectric perovskite materials including metal titanates. In still another embodiment, the piezo-optical core has an unstressed index of refraction that is less than a stressed index of refraction. In some further non-limiting embodiments, the PO core has a width of about 100 microns to about 200 microns. Specific examples of widths include about 100 microns, about 125 microns, about 150 microns, about 175 microns, about 200 microns, and ranges between any two of these values.

The piezo-optical core may be processed from a piezo-optical material that comprises a single component, or a matrix with a dopant. The processing procedure may include at least one of thermal extrusion, casting and die cutting, die forming, spinning, pulling, calendering and dicing, stamping, embossing, and solution printing. To provide PO cores possessing the correct micro-alignment of material, and thereby permitting light to be transmitted preferentially along the transverse length of the cores, the cores may be poled. The poling process may include, without limitation, the simultaneous application of any two of heating the piezo-optical cores to about or above their softening temperature, subjecting the cores to an electric field, mechanically stressing the cores, subjecting the cores to radiation, and subjecting the cores to a solvent. In one embodiment, an electric field may be supplied by electrodes or electrical discharge. In another embodiment, the radiation may have at least one energy component from about 180 nm to about 1000 nm. Specific examples of wavelengths include about 180 nm, about 200 nm, about 300 nm, about 400 nm, about 500 nm, about 600 nm, about 700 nm, about 800 nm, about 900 nm, about 1000 nm, and ranges between any two of these values. To maintain piezo-optical core internal micro-alignment, the cores may be operated at a temperature about or below the glass transition temperature of the piezo-optical material. In this manner, the cores will not soften or permit the internal micro-structure to randomize.

FIG. 1b illustrates the use of a PO core as part of a waveguide (20). In an embodiment, the waveguide comprises a cladding component (30) disposed against at least one side of a piezo-optical core (10). It is understood, however, that a waveguide may have a cladding component disposed against each of the opposing sides of the core. The cladding component forms an optical interface (35) against the core, and the cladding may be disposed against part of the length, the entire length, or extend beyond the length of the core. In some embodiments, the cladding material comprises, as non-limiting examples, a fluorinated solution processable or thermoset resin comprising at least one of poly(1,1,1,3,3,3-hexafluoroisopropyl methacrylate-co-glycidyl methacrylate), poly(2,2,2-trifluoroethyl methacrylate-co-glycidyl methacrylate), poly(2,2,3,3,3-pentafluoropropyl methacrylate-co-glycidyl methacrylate), fluorinated epoxy polymers, and/or poly(2,2,3,3,4,4,4-heptafluorobutyl methacrylate-co-glycidyl methacrylate). In some non-limiting embodiments, the cladding component further has a refractive index less than both the stressed and unstressed refractive indices of the piezo-optical core.

FIG. 1b further illustrates a flexible substrate (40) on which the waveguide is mounted. In some embodiments, the substrate may be presented as a substrate layer. The waveguide forms two optical interfaces with the substrate, an interface between the cladding and the substrate (42) and an interface between the piezo-optical core and the substrate (45). In some embodiments, the substrate material comprises, as non-limiting examples, at least one of a fabric, silicone, polyurethane, polyethylene terephthalate, and/or polyvinyl chloride. In some embodiments, the substrate material has a refractive index less than both the stressed and unstressed refractive indices of the piezo-optical core.

Figure 1C:
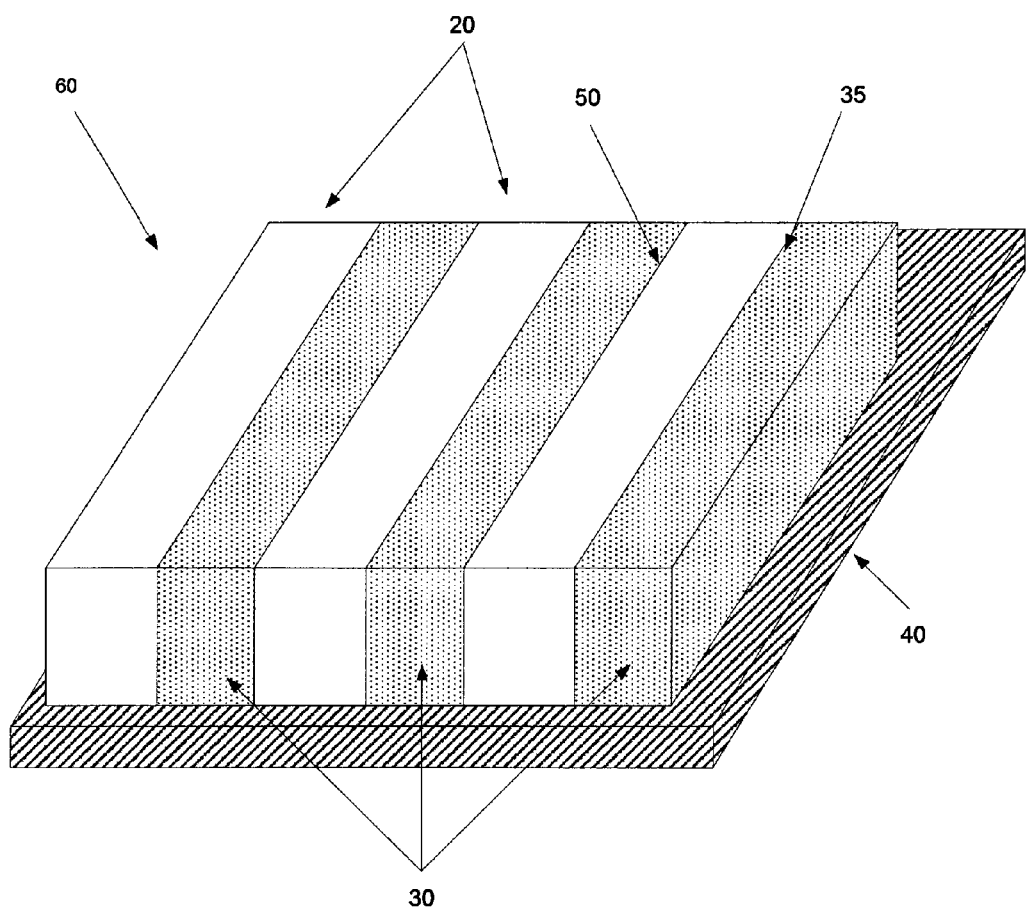
FIG. 1c illustrates multiple waveguides disposed against each other on a flexible substrate in accordance with the present disclosure.

FIG. 1c illustrates an embodiment of the disposition of multiple waveguides on a substrate. In some non-limiting embodiments, the waveguides may be aligned together with the PO core (20) of one waveguide disposed against the cladding component (30) of a second waveguide, thereby forming an optical interface (50) between the PO core of a first waveguide and the cladding component of a second waveguide. FIG. 1c further illustrates the optical interface (35) between the piezo-optical core and cladding component within a waveguide. In another embodiment, the waveguides may be separated by some distance, each waveguide further comprising a second cladding component against the second core side (not shown). FIG. 1c also illustrates interface layer (60), which comprises the entire structure of PO cores (20) and cladding (30), mounted on substrate (40).

In one embodiment, interface layer (60) may be fabricated in the following manner. The piezo-optical cores may be arranged in a single layer in which the cores are completely separated with no point of contact between them. The cladding material may be furnished to the PO core layer as a viscous liquid poured onto the layer of PO cores so that the liquid cladding component encircles the individual cores, contacting them on their sides. The liquid cladding may not be permitted to reach a level sufficient to cover the cores completely. The combination of cladding and piezo-optical cores together may be termed a piezo-optical waveguide layer. The interface layer may then be formed by associating the waveguide layer with a substrate layer comprising the substrate material.

In some embodiments, the cladding component may not readily form an optical interface with the piezo-optical core material. For such a mismatch of materials, it may be necessary to coat the cores with a layer comprising an adhesion promoter. In some embodiments, the adhesion promoter may comprise, as non-limiting examples, at least one of aminopropyltrimethoxysilane, aminopropyltriethoxysilane, glycidoxypropyltrimethoxysilane, and/or glycidoxypropyltriethoxysilane.

In some further embodiments, the cladding component may be cured.

In some embodiments, the waveguide layer may be associated with the substrate layer by heating the substrate layer to a temperature about or above its softening point temperature, and then pressing the waveguide layer onto the substrate layer. In one embodiment, a hot press lamination device may be used to press the waveguide layer onto the substrate layer.

It is understood that the methods disclosed herein regarding the fabrication of an interface layer are not taken as limiting, and the various steps may be altered or omitted depending on the materials employed, the size of the interface layer, or other conditions dictated by fabrication requirements.

Figure 2A:
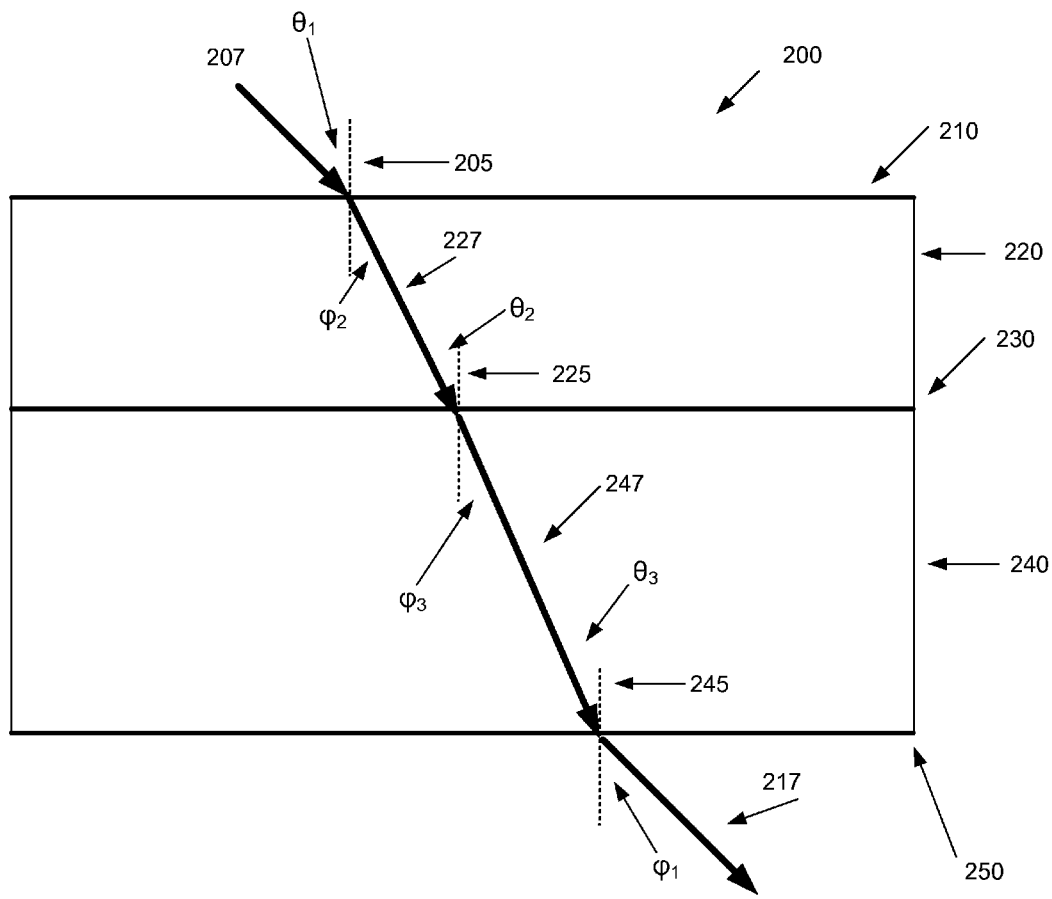
FIG. 2a illustrates the trajectory of a light ray impinging on an unstressed piezo-optical core mounted on top of a flexible substrate in accordance with the present disclosure.
Figure 2B:
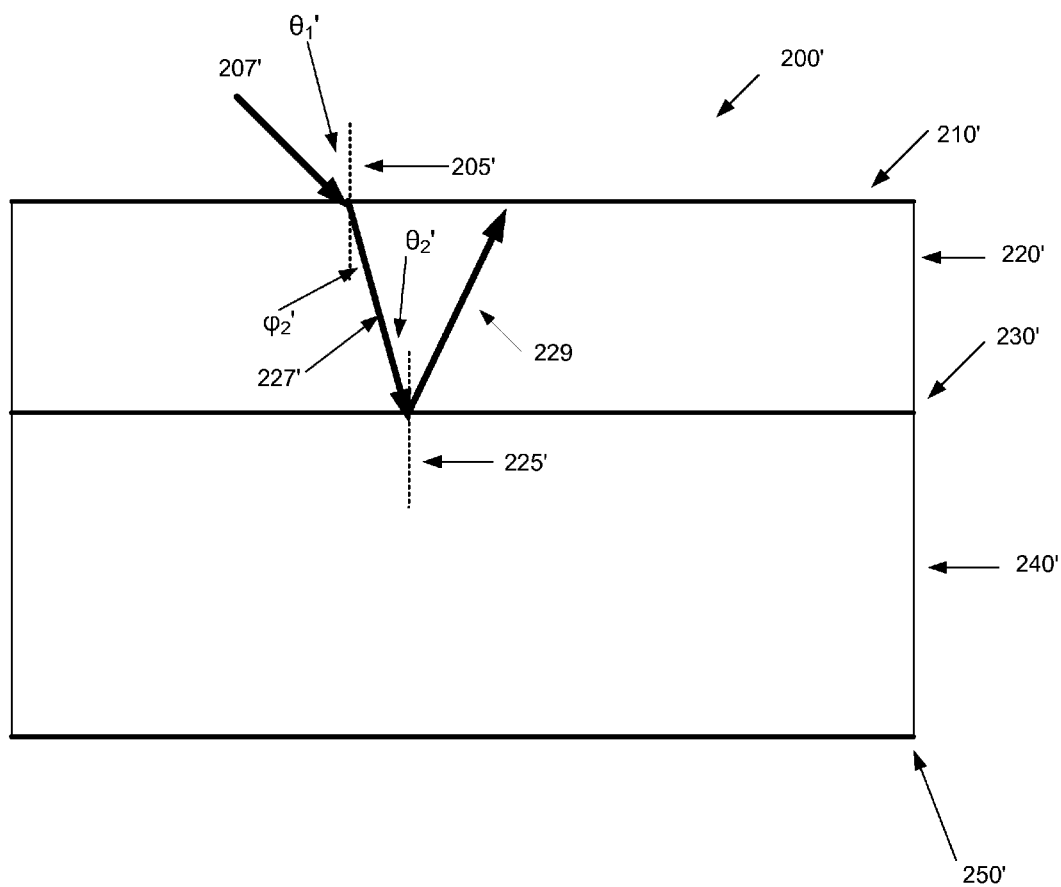
FIG. 2b illustrates the trajectory of a light ray impinging on a stressed piezo-optical core mounted on top of a flexible substrate in accordance with the present disclosure.

In order to appreciate the mechanism by which the piezo-optical core may function, FIGS. 2a and 2b illustrate the application of Snell's law to an unstressed PO core (FIG. 2a) and to a stressed PO core (FIG. 2b) associated with a flexible substrate.

FIG. 2a illustrates a side view of a PO core (220) affixed to a substrate (240). For the purposes of this illustration, the core and substrate are suspended in a region of air (200). FIG. 2a illustrates three optical interface regions: an air/core interface (210), a core/substrate interface (230), and a substrate/air interface (250).

As illustrated in FIG. 2a, a ray of light propagating through the air (207) may impinge on the air/PO interface (210) at an incidence angle ($\theta_1$) to the normal (205) of the interface (210). In FIG. 2a, the piezo-optical material is in the unstressed state with an unstressed index of refraction represented by $n_2$. The index of refraction air will be represented by $n_1$. The light ray propagating through the piezo-optical material (227) is refracted, so that the ray forms an air/core refracted angle ($\phi_2$) with respect to the air/core interface normal (205). The relationship between the incident and refracted angles is dependent on the index of refraction of the materials as given by Snell's law:

$$n_1 \sin \theta_1 = n_2 \sin \phi_2 \qquad \text{Eq. 1}$$

If $n_1$ is less than $n_2$, Eq. 1 teaches that refracted angle ($\phi_2$) will be less than incident angle ($\theta_1$).

As further illustrated in FIG. 2a, the refracted light ray may propagate through the PO material (227) until it impinges on PO/substrate interface (230) at a PO/substrate incidence angle ($\theta_2$) with respect to the PO/substrate interface normal (225). Again, the light is refracted at the interface, and thereafter may propagate through the substrate material (247) at a substrate refracted angle ($\phi_3$) with respect to the PO/substrate interface normal (225). Snell's law again is obeyed, according to:

$$n_2 \sin \theta_2 = n_3 \sin \phi_3 \qquad \text{Eq. 2}$$

in which $n_3$ is the index of refraction of the substrate material. If $n_3$ is less than $n_2$, then refracted angle ($\phi_3$) will be greater than incident angle ($\theta_2$).

FIG. 2a further illustrates the resulting path of the light ray refracted through the substrate material (247). Similar to the previous explanation, the light ray (247) may impinge on substrate/air optical interface (250), at a substrate/air incidence angle ($\theta_3$) to the substrate/air interface normal (245). The resulting refracted light ray (217) may then propagate through the air at a refracted angle ($\phi_1$) to the substrate/air normal (245).

While light also can reflect at the various optical interfaces, the resulting reflected light paths are not illustrated in FIG. 2a.

FIG. 2b illustrates the change in the light path for a piezo-optical core material placed under stress. The index of refraction of the stressed PO material ($n_2'$) is greater than that of the unstressed PO material ($n_2$). Many of the elements of FIG. 2b are the same as in FIG. 2a, and are denoted using the same reference numbers as in FIG. 2a as primed numbers. Thus, air, PO material, and substrate material are denoted by (200'), (220'), and (240'), respectively. Similarly, the air/PO material interface and PO material/substrate material interface are denoted by (210') and (230'), respectively, with interface normals (205') and (225'), respectively.

FIG. 2b illustrates a light ray propagating through air (207') and impinging on the air/PO material interface (210') at an incident angle ($\theta_1'$) with respect to the air/PO interface normal (205'). The resulting light through the PO material (227') is refracted at the air/PO material interface by a refracted angle ($\phi_2'$) with respect to the normal, obeying Snell's law. However, since the stressed PO material index of refraction, $n_2'$, is greater than the unstressed PO material index of refraction, $n_2$, the stressed refraction angle ($\phi_2'$) is less than the unstressed refracted angle ($\phi_2$).

As the light ray propagates through the stressed PO material (207'), it impinges on the PO material/substrate interface (230'), forming incident angle ($\theta_2'$) with respect to the PO/substrate interface normal (225'). From Snell's law, using the stressed PO index of refraction ($n_2'$), Eq. 2 becomes Eq. 3:

$$n_2' \sin \theta_2' = n_3 \sin \Phi_3 \qquad \text{Eq. 3}$$

where $\Phi_3$ denotes the theoretical refracted angle at interface (230'). Eq. 3 may be re-written as Eq. 4:

$$(n_2'/n_3) \sin \theta_2' = \sin \Phi_3 \qquad \text{Eq. 4}$$

If the stressed PO index of refraction is much greater than the index of refraction of the substrate—that is, ($n_2'/n_3$) becomes large—a condition may occur in which the left-hand-side of Eq. 4 becomes greater than 1. For example, if ($n_2'/n_3$)=10, then any value of incidence angle ($\theta_2'$) greater than a critical angle $\theta_T$=5.74 degrees would result in sin $\Phi_3$ being greater than 1, which is mathematically unrealizable. Thus, refraction cannot occur at this interface for incidence angle ($\theta_2'$) greater than $\theta_T$, and all the light is reflected back into the PO material (229). This phenomenon is termed total internal reflection, and is the basis for optical fiber technology.

Eq. 4 further implies that the critical angle decreases as the ratio ($n_2'/n_3$) increases. For example, if ($n_2'/n_3$)=20, then $\theta_T$=2.86 degrees. Thus, a substrate-mounted piezo-optical material that is exposed to light rays having a random distribution of orientations with respect to the PO core face will conduct more light within the stressed piezo-optical material than the unstressed material. For piezo-optical material in the stressed condition, a greater proportion of randomly-oriented light will fall outside the critical angle than under the unstressed condition.

Figure 3A:
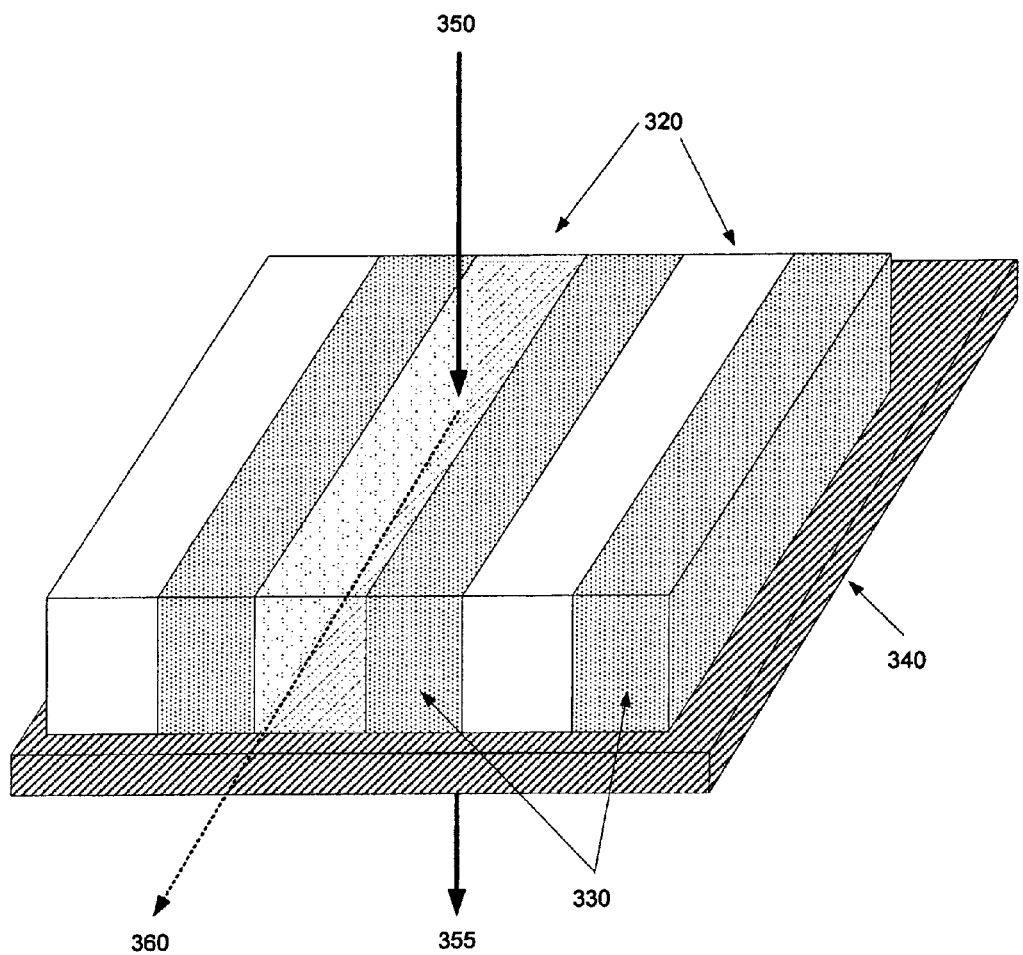
FIG. 3a illustrates the trajectory of a light ray impinging on an embodiment of an unstressed piezo-optical based stress activated interface in accordance with the present disclosure.
Figure 3B:
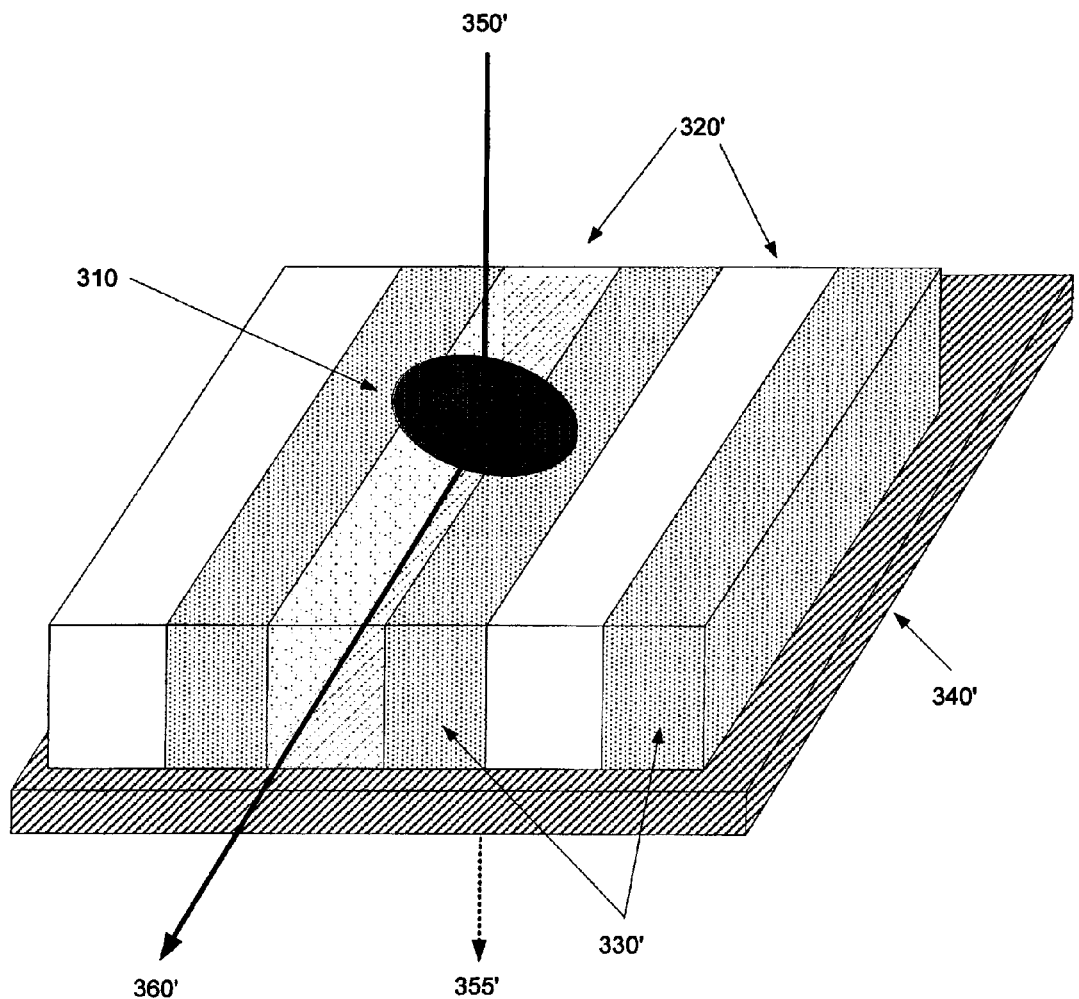
FIG. 3b illustrates the trajectory of a light ray impinging on an embodiment of a stressed piezo-optical based stress activated interface in accordance with the present disclosure.

FIGS. 3a and 3b illustrate this difference. FIG. 3a illustrates a series of waveguides, comprising alternating piezo-optical core material (320) and cladding material (330), disposed on a substrate (340). Incident light (350) illuminates the waveguides. Although the light (350) as illustrated in FIGS. 3a and 3b comprises a single ray impinging on the face of a specific PO core, it is understood that the light from the source (not shown) illuminates all the waveguides, and the incident angle the light makes with the core faces is not limited to 90 degrees. Under the unstressed condition, illustrated in FIG. 3a, the majority of the light passes through the PO core and substrate (355). Some amount of light may impinge on the PO core/substrate interface at an angle greater than the critical angle of the unstressed PO material, and may propagate along the transverse length of the core (360) due to total internal reflection. In FIG. 3a, the weight of line (355) representing the propagation of a light ray is greater than that of (360), indicating that the majority of the incident light (350) is transmitted through the interface, with a smaller amount propagating along the transverse length of the PO core.

FIG. 3b illustrates the effect of the addition of stress (310) to the piezo-optical core material (320'). In this embodiment, the stress applied to one of the cores results in an increase in the local index of refraction of the piezo-optical core. As a result, a greater amount of the incident light (350') may be transmitted along the transverse length of the stressed core (360') due to total internal reflection, and less passes through the core and underlying substrate (355').

A measurement of some value associated with light propagating along the core's transverse length may be made in its unstressed state and in its stressed state. In some embodiments, light propagation may be sensed by a light receiving element optically coupled to at least one end of each piezo-optical core (not shown). In some embodiments, a light receiving element is optically coupled at each end of each piezo-optical core, thereby providing a redundant measure of light propagation. In some embodiments, the light receiving element comprises, as non-limiting examples, at least one of a charge coupled device, a photodiode, a pyroelectric detector, a photoresistor, a photovoltaic cell, a photomultiplier tube, and/or a phototransistor. As disclosed herein with reference to FIGS. 3a and 3b, the amount of light that propagates along the transverse length of a stressed core will be greater than that which propagates along the transverse length of an unstressed core. It is understood that the stress is applied locally to one or a few adjacent cores, as indicated in FIG. 3b. The remaining, unstressed PO cores will conduct light as indicated in FIG. 3a.

It is understood that the light impinging on the piezo-optical core may originate from a variety of sources. In some embodiments, the light source comprises, as non-limiting examples, at least one of direct sunlight, indirect sunlight, filtered sunlight, an incandescent source, a fluorescent source, a discharge source, an LED source and/or a filtered light source. While ambient light may be used to illuminate the mechanical stress activated interface as illustrated in FIGS. 3a and 3b, the interface itself may also incorporate a specific light source directed towards the piezo-optical cores (not shown in FIGS. 3a and 3b, but illustrated as (680) in FIG. 6). In some embodiments, the incorporated light source may provide, as non-limiting examples, continuous light rays, pulsed light rays, or both continuous light rays and pulsed light rays. In some further embodiments, the light provided by the incorporated light source may comprise, as one non-limiting example, light with at least one wavelength range from about 400 nm to about 700 nm. Specific examples of wavelengths include about 400 nm, about 500 nm, about 600 nm, about 700 nm, and ranges between any two of these values. In yet additional embodiments, the mechanical stress activated interface may also incorporate at least one light filter. The light filter may further comprise, as non-limiting examples, at least one of a polarizing filter, a low pass filter, a high pass filter, a notch filter, and/or a bandpass filter.

A mechanical stress activated interface as illustrated in FIGS. 3a and 3b and as disclosed herein in its various non-limiting embodiments, may be incorporated into a mechanical stress activated interface system. In addition to the multiplicity of waveguides disposed on a flexible substrate in which at least one light receiving element is optically coupled to at least one end of each of the piezo-optical cores, the interface system may also comprise an electronic system configured to receive the output data from any one, any group of, or all of the light receiving elements. The electronic system may comprise any one of active, passive, analog or digital components, or any combination of such components. In some embodiments, the electronic system may comprise, as non-limiting examples, at least one of an electronic signal amplifier, an electronic signal filter, an electronic signal threshold detection device, an analog-to-digital converter, a microprocessor, a dynamic memory system, a physical memory device configured to store instructions for the operation of the microprocessor, a signal output device, a visual display device, and/or a communication system. In some additional embodiments, the communication system may comprise, as non-limiting examples, at least one of a wired system, an optical cable system, a cable-less optical transmission system, and/or a wireless radio frequency transmission system. While singular instances of each type of electronic component in the electronic system are disclosed herein, it is understood that multiple instances of any electronic component are also anticipated.

A touch screen interface embodiment, as illustrated in FIGS. 3a and 3b and disclosed herein, can resolve the location of an applied stress in one dimension only. In an embodiment illustrated in FIG. 4, a pair of such interfaces may be stacked upon each other with the transverse length of the PO cores of a first interface oriented at some angle with respect to those of a second interface. In such an embodiment, the location of a stress applied to the composite system can be resolved in two dimensions. In some embodiments, the orientation angle of the two interfaces may be about 90 degrees. Thus, in FIG. 4, one interface layer having a waveguide layer, comprising piezo-optical cores (415) alternating with cladding material (435), and mounted on a first substrate (445), may overlay a second interface layer comprising alternating PO cores (410) and cladding (430) on a second substrate (440). Although FIG. 4 illustrates the use of a pair of such interface layers, it is understood that alternative embodiments may include the use of more than two such interface layers.

Figure 4:
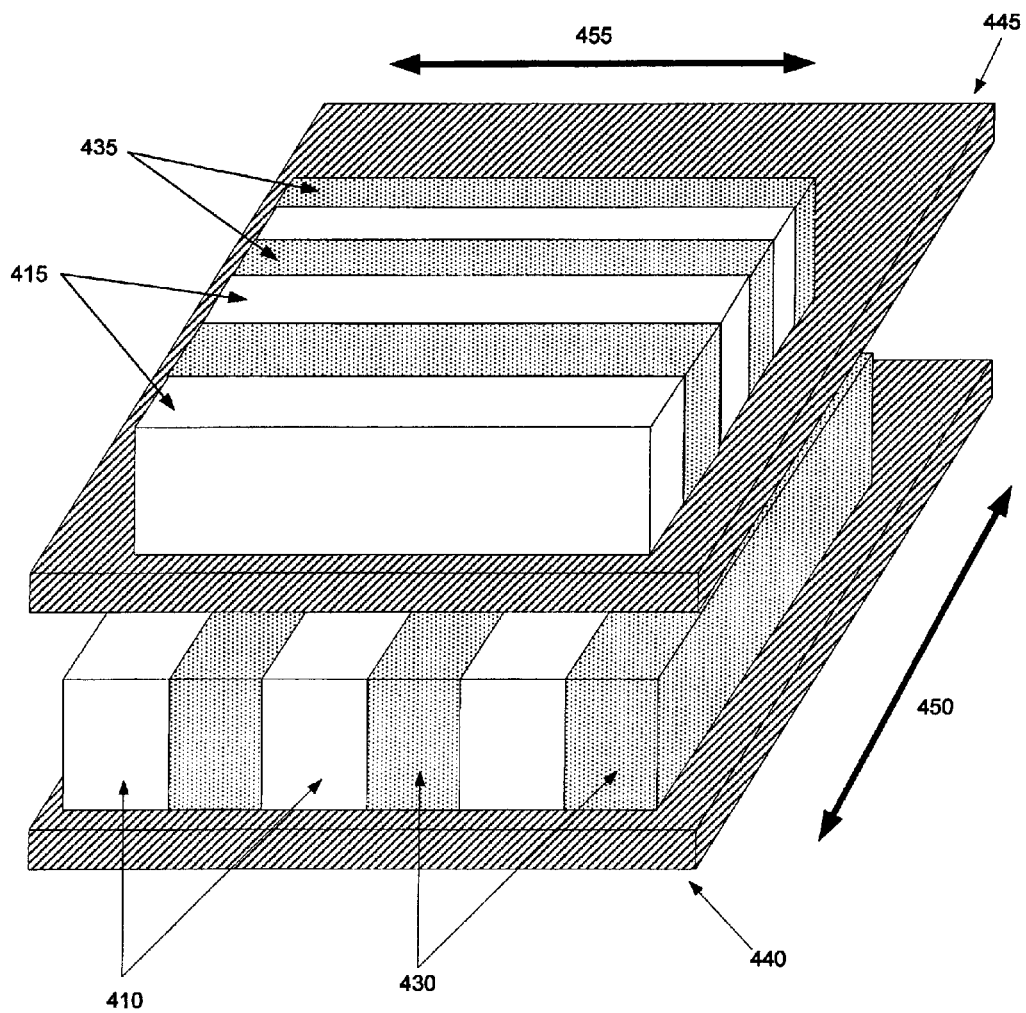
FIG. 4 illustrates an embodiment of a two-layer, piezo-optical-based, stress-activated interface in accordance with the present disclosure.
Figure 5:
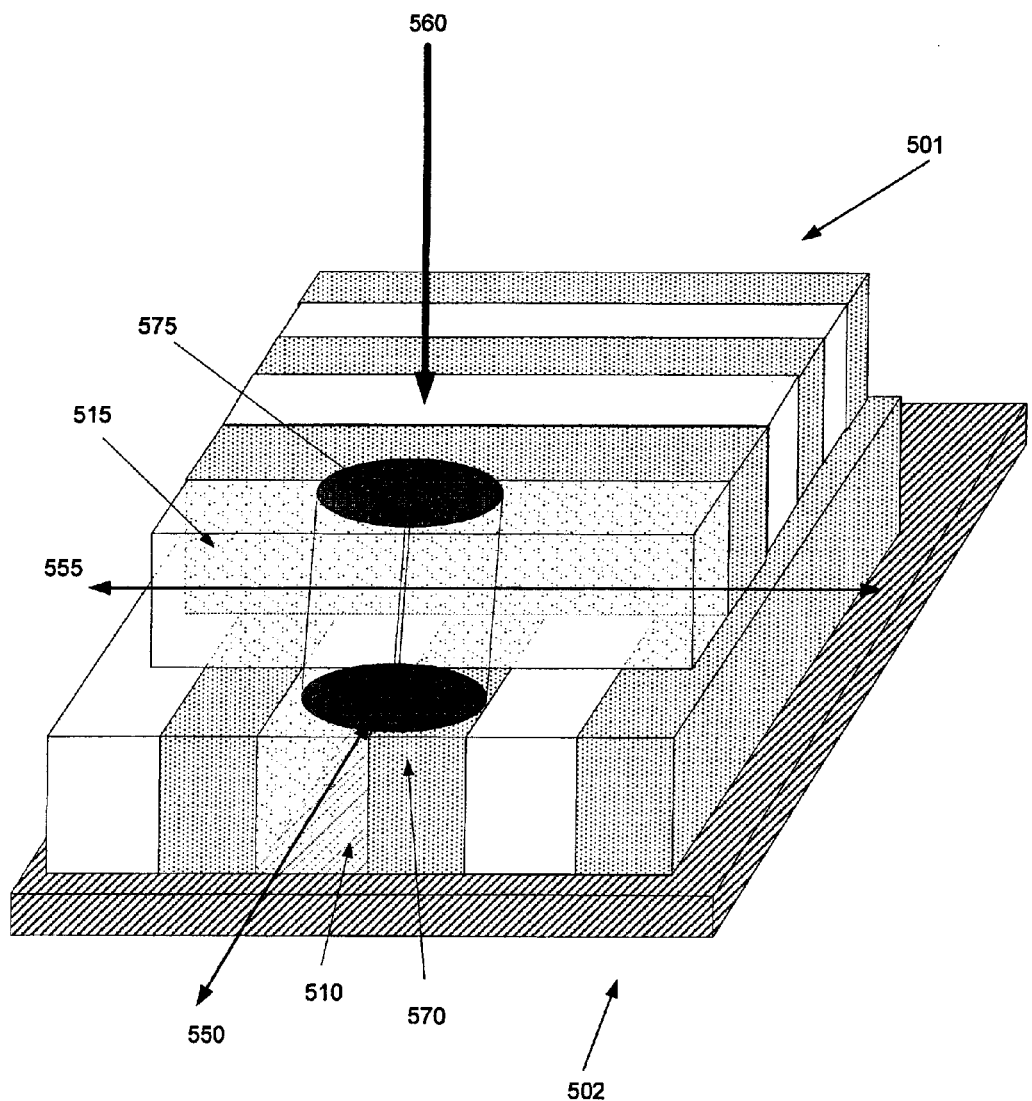
FIG. 5 illustrates light impinging on an embodiment of a stressed two-layer, piezo-optical-based, stress-activated interface in accordance with the present disclosure.

FIG. 5 illustrates how the location of applied stress may be resolved in two dimensions using such a two-layer touch screen device. It is noted in FIG. 5 that the first substrate material, equivalent to (445) in FIG. 4, is omitted solely for clarity. In practice, both substrate layers would be present. In an embodiment illustrated in FIG. 5, a light ray (560) from an ambient source impinges on the top waveguide layer (501) of the top interface layer. Stress may be applied to a portion of the first interface layer surface (575), and will mechanically propagate to an equivalent portion of the surface (570) of the bottom interface layer (502). The applied stress increases the local index of refraction of the affected PO core of the top waveguide layer (515) along with the equivalent core in the bottom waveguide layer (510). As a result, light will preferentially propagate along the transverse lengths of both the top core (555) and bottom core (550) thus affected. As disclosed herein with respect to FIGS. 3a and 3b, each piezo-optical core is optically coupled to a light receiving element to sense the amount of light propagating along the transverse length of the core. Each light receiving element provides a data output which may be coupled to an electronic system as previously disclosed.

An alternative embodiment is illustrated by FIG. 6, wherein the interface system comprising a top layer (601) and a bottom layer (602) further comprises a light source (680). As disclosed above, the light source may be pulsed, continuous, or both pulsed and continuous. In addition, the light may be polarized, and may have at least one wavelength from about 400 nm to about 700 nm. Specific examples of wavelengths include about 400 nm, about 500 nm, about 600 nm, about 700 nm, and ranges between any two of these values. In some embodiments, the interface system in FIG. 6 may also include at least one optical filter, the filter comprising any one or combination of a polarizing filter, a low pass filter, a high pass filter, a notch filter, and/or a bandpass filter. Although FIG. 6 illustrates a light source located below the substrate layer of the bottom interface layer (602), it is understood that the light source may also be located above the top interface later (601), or may be located between the top and bottom interface layers (not shown).

FIGS. 3-6 illustrate embodiments in which the piezo-optical cores are arrayed in parallel lines. In particular, FIG. 4 illustrates an arrangement of interface layers to provide a Cartesian coordinate system for resolving two-dimensional localization of stress applied to the touch screen system. It should be understood that other embodiments of touch screen interfaces may use piezo-optical cores oriented according to other arrangements. As one alternative embodiment, one interface layer may comprise PO cores arranged in a radiating pattern while the second interface layer may comprise PO cores arranged in concentric circles or arcs, thereby providing a polar coordinate system for resolving two-dimensional localization of stress applied to the system. Other non-limiting embodiments may comprise a pair of interface layers in which the piezo-optical cores are arranged to provide a parabolic coordinate system, hyperbolic coordinate system, or other coordinate system capable of resolving two-dimensional space.

Figure 7A:
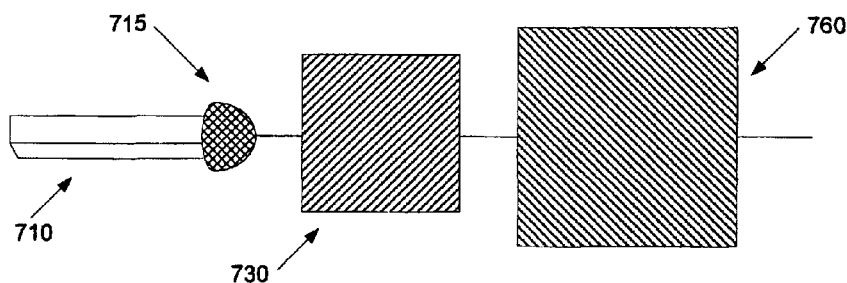
FIG. 7a illustrates an embodiment of an electronic system of a piezo-optical-based, stress-activated interface system in accordance with the present disclosure.
Figure 7B:
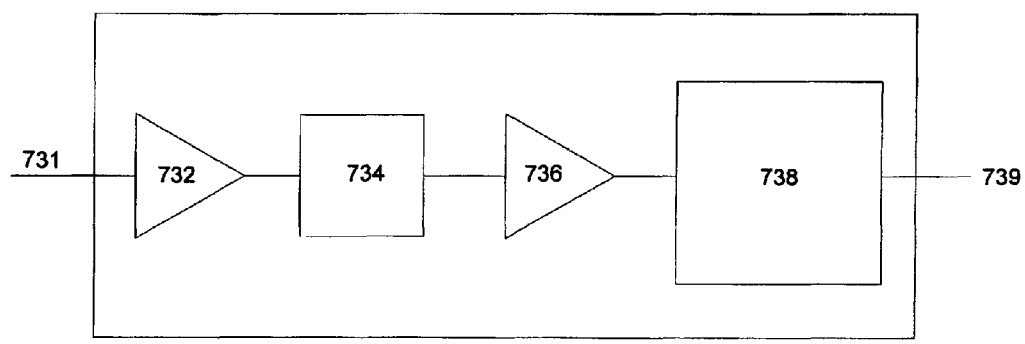
FIG. 7b illustrates details of an embodiment of a conditioning electronics subsystem of a piezo-optical-based, stress-activated interface system in accordance with the present disclosure.
Figure 7C:
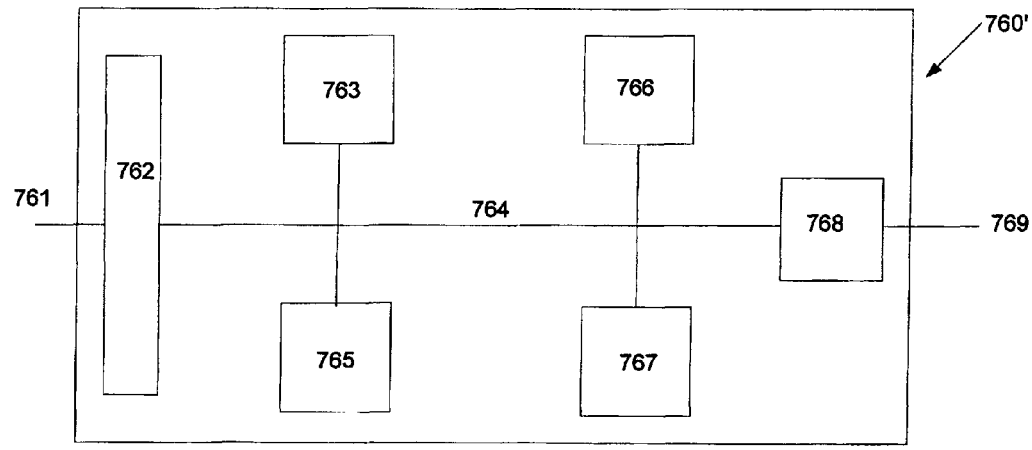
FIG. 7c illustrates details of an embodiment of a computer subsystem of a piezo-optical-based, stress-activated interface system in accordance with the present disclosure.

FIGS. 7a-c illustrate embodiments of an electronic system associated with the touch screen interface system. FIG. 7a illustrates subsystems of the electronics. As disclosed herein with respect to the mechanical activation piezo-optical interface, a piezo-optical core (710) may be optically coupled to a light receiving element (715) at least at one end of the core. The light receiving element may produce a signal output related to the intensity of light it receives that propagated along the transverse length of the piezo-optical core. This output signal may be supplied to a signal conditioning subsystem (730). The output of the signal conditioning subsystem may then be supplied to a computer subsystem (760).

FIG. 7b illustrates, in more detail, some embodiments of the signal conditioning subsystem (730').

The signal input (731) to the signal conditioning subsystem may originate from the light receiving element (715) illustrated in FIG. 7a. The input signal may be buffered and/or amplified by buffer/amplifier (732). Characteristics of such an amplifier may include but are not limited to high gain, high input impedance, and/or low noise.

The output of the buffer/amplifier may serve as input to a signal filter (734). The filter may comprise active, passive, or both active and passive components, and may comprise several stages. In one non-limiting embodiment, the filter may comprise a low pass filter to remove high frequency noise from its input. In an alternative non-limiting embodiment, the filtering function may be provided through a digital signal processing algorithm executed by a microcontroller. In still another non-limiting embodiment, the filter may comprise a phase-locked amplifier synchronized to a pulsed light source.

The output of the filter may then be directed to the input of a second amplifier/buffer (736). This second amplifier/buffer may further comprise, as non-limiting embodiments, a thresholding amplifier or comparator. In one embodiment, a comparator may produce a digital signal that may be set to a digital high state when the comparator input exceeds a reference voltage, and remain at a digital low state when the comparator input is less than the reference voltage. In another embodiment, the comparator may comprise an analog thresholding amplifier that reduces the DC level of its output by the reference voltage. In certain embodiments, the reference voltage for the thresholding amplifier/comparator may be adjusted by means of a trim-pot or may be generated by a fixed reference supply. In other embodiments, the reference voltage may be set by a computer according to the computer programming.

The output of second amplifier/buffer (736) may serve as input to a computer interface (738) in data communication with a computer, (760) in FIG. 7a, and (760') in FIG. 7c. In one embodiment, computer interface (738) may receive a digital signal from comparator (736), and transmit a buffered digital signal to computer (760). In another embodiment, computer interface (738) may receive an analog signal from amplifier (736) and produce a digitized representation of the analog signal on a parallel digital cable. In yet another embodiment, the computer interface may receive an analog signal from an amplifier and produces a digitized representation of the analog signal as a serial stream of bits.

The computer interface (738) may provide an output (739) of the filtering subsystem (730') that then may be transmitted to a computer, (760) in FIG. 7a or (760') in FIG. 7c. A variety of transmission technologies may be employed to provide the output of the filtering subsystem (730') to the computer. In some embodiments, the interface (738) may provide an output signal (739) to a computer via, as non-limiting examples, a wired connection, an optical connection, a wireless RF connection, and/or a wireless IR connection. The output signal (739) may be transmitted directly to a computer, or may be directed to other electronic devices. Although the embodiments disclosed herein illustrate an output signal (739) produced by the computer interface (738) and transmitted to a computer or other electronic device, it is understood that other embodiments may include the computer interface (738) receiving data from a computer or other electronic system in order to alter or modify the operations of filtering subsystem (730').

It is understood that the signal conditioning subsystem as disclosed herein may comprise any or all of the components illustrated in FIG. 7b, in any order, and that additional or alternative signal conditioning components not explicitly disclosed herein may be included in this subsystem. For example, in one embodiment, the signal filtering subsystem may comprise a microprocessor capable of performing digital signal processing on the input signal (731).

FIG. 7c illustrates a detailed representation (760') of computer subsystem (760) in FIG. 7a.

The input signal (761) to computer subsystem (760') may be equivalent to the output signal (739) of FIG. 7b of conditioning electronics subsystem (730') of FIG. 7b. It is understood that input signal (761) may be identical to conditioning electronics output (739) of FIG. 7b, or it may arise from a signal produced by another device. In a further embodiment, input signal (761) may arise from another device responding to the receipt of conditioning electronics output (739) of FIG. 7b.

Computer subsystem (760') may receive input (761) through a computer I/O interface (762). In one embodiment, computer subsystem (760') only receives data through I/O interface (762). In other embodiments computer subsystem (760') may provide data to other devices including conditioning electronics (730') of FIG. 7b via this interface. In some embodiments, the I/O interface may comprise, as non-limiting examples, a bus interface, a serial interface, an optical coupling interface, an Ethernet interface, and/or a wireless interface.

The data obtained through the I/O interface (762) may be directed to any of a variety of computer subsystem components, including but not limited to a microprocessor or controller (763), dynamic memory (765), static memory (766), a human interface (767), and/or a computer communications interface (768). Microprocessor (763) may comprise any of a variety of devices including, as non-limiting examples, a general purpose microprocessor or a specialized digital signal processing device. Static memory (766) may comprise, as non-limiting examples, a flash memory, a hard drive, and/or a digital thumb drive. Dynamic memory (765) may comprise, as non-limiting examples, dual in-line packages, single in-line packages, single in-line modules and/or dual in-line modules. Human interface (767) may comprise a variety of interface types including, without limitation, a CRT monitor, an LED display, and/or a liquid crystal display. It is understood that human interface (767) may also be in data communication with devices for providing human input into the computer, including, as non-limiting examples, a keyboard, a mouse, a stylus, and/or a voice recognition system.

The various computer subsystem components may be interconnected via an internal data bus (764). In addition to providing a data path for data arriving from I/O interface (762), data bus (764) may also provide a path for microcontroller (763) to receive instructions for operations from dynamic memory (765) or static memory (766), or to provide data to or receive data from human interface (767). Microcontroller (763) may also use data bus (764) to control the operation of computer communication interface (768).

Computer subsystem (760') may also comprise a computer communication interface (768). Communication interface (768) may allow computer subsystem (760') to communicate with a wide variety of other devices not otherwise in communication with the computer subsystem through I/O interface (762) via computer communication subsystem output (769). Computer communication interface (768) may comprise, in some embodiments as non-limiting examples, wired communications, optical communications, wireless RF communications, IR communications, and/or Ethernet communications.

It is understood that the computer subsystem may comprise any or all of the components illustrated in FIG. 7c, in any order or in any manner of signal connectivity, and that additional computer associated components not explicitly disclosed herein may be included in this subsystem.

The touch screen interface and electronic system as disclosed herein may be used together to provide a mechanical stress activated interface system. In one non-limiting embodiment, the interface system may comprise a two-layer interface similar to the embodiment illustrated in FIG. 4, in which each piezo-optical core is optically coupled to a single light receiving element at one end of the core, each light receiving element provides a signal output, and each signal output is provided as an input to an electronic system as illustrated in FIG. 7a. The mechanical stress activated interface system may be used to locate a stress applied to the interface.

A source of light may be provided for illuminating the stress activated piezo-optical interface, such as from a computer monitor or display. A stress input may be applied to the illuminated interface. In one non-limiting embodiment, the stress input may result from an activity of a human operator. In some embodiments, the activity may comprise, as non-limiting examples, pushing, pressing, touching, squeezing, and/or bending the interface system. The resultant stress may affect at least one piezo-optical core of either one or both of the interface layers at the location to which the stress is applied. The stress input will result in a localized change in the index of refraction of the affected core or cores, thereby causing a change in the amount of light propagated along the affected cores' transverse length. The change in light impinging on the light receiving element(s) coupled to the stressed core(s) will produce a change in its or their output(s). In some embodiments, the change in the light receiving element output(s) may be detected by the electronic system.

As disclosed herein, the light source may comprise, as non-limiting examples, direct sunlight, indirect sunlight, filtered sunlight, an incandescent source, a fluorescent source, a discharge source, an LED source and/or a filtered light source. In one non-limiting embodiment, at least one light source may be incorporated into the interface itself. In other embodiments, the light source may be continuous, pulsed, or pulsed and continuous, and may provide light rays having at least one wavelength from about 400 nm to about 700 nm. Specific examples of wavelengths include about 400 nm, about 500 nm, about 600 nm, about 700 nm, and ranges between any two of these values. In other embodiments, the interface may also include at least one light filter, that may comprise, as non-limiting examples, a polarizing filter, a low pass filter, a high pass filter, a notch filter, and/or a bandpass filter.

A change in illumination of the light receiving elements may be detected in a variety of ways. In one non-limiting embodiment, the light receiving element outputs of the two-layer interface may be poled over time. Sequentially measured output values from each light receiving element may be subtracted. For example, the output of element $E_i$ associated with the first interface layer measured at time $t_2$ may be subtracted from the output of element $E_i$ measured at an earlier time $t_1$ to provide a difference in output $\Delta E_i(t_2-t_1)$. A similar calculation may be performed for the output of an element $E_j$ associated with the second interface layer. Under the stressed condition, the PO core coupled to element $E_i$ will permit increased illumination of element $E_i$, which will result in a larger $E_i$ output value. For an interface system comprising a pair of interface layers oriented at some angle with respect to each other, the point of stress may be localized by calculating a value of $\Delta E_i(t_2-t_1)$ for a stressed core associated with the first interface layer and $\Delta E_j(t_2-t_1)$ for a corresponding core associated with the second interface layer. In one embodiment, a thresholded difference may be calculated by subtracting a threshold value $T_i$ from $\Delta E_i(t_2-t_1)$ and a threshold value $T_j$ from $\Delta E_j(t_2-t_1)$. The position of the applied stress may be localized if the thresholded differences in $\Delta E_i(t_2-t_1)$ and $\Delta E_j(t_2-t_1)$ meet some programmed criteria.

In another embodiment, the light receiving element outputs of the two-layer interface may be routinely poled over time, but the threshold value $T_i$ may be subtracted from the output of element $E_i$ and the value $T_j$ may be subtracted from the output of element $E_j$ after each polling measurement, thereby forming thresholded outputs. Under unstressed conditions of a PO core of either first or second interface layer, the equivalent $E_i$ (or $E_j$) output may lie at or below threshold $T_i$ (or $T_j$), and thus the thresholded output of $E_i$ (or $E_j$) would be negative.

It is understood that the subtraction and thresholding functions can be provided either through the use of a difference amplifier or comparator (electronic hardware), calculated using a programmable microprocessor unit (under software control), or otherwise accomplished using the electronic system disclosed herein, or any other device capable of performing such calculations.

It is understood that the method disclosed herein presents a non-limiting embodiment, and that alternative embodiments may include any or all of the steps, in any order, and that additional or alternative steps not explicitly disclosed herein may be included.

EXAMPLES

Example 1

Mechanical Stress-Activated Interface

A mechanical stress-activated interface may be constructed using copolymers of vinylidene fluoride and trifluoroethylene as the core material, and a cladding material comprising 2,2,3,3,3 pentafluoro methacrylate-co-glycidyl methacrylate, having an index of refraction ranging from about 1.46 to about 1.48. Waveguides made from the core plus cladding materials may be layered over a substrate of polyethylene terephthalate, which has an index of refraction of about 1.57.

The ends of the waveguides may be optically coupled to light receiving elements comprising a linear array of silicon photodiodes. In one embodiment, the waveguides may be abutted against the elements of the detector array and mechanically affixed to them using an optical coupling material having an appropriate index of refraction. In another embodiment, the array may not be attached physically to the ends of the waveguides, the light propagating from the waveguide ends to the array elements through free space. In this latter embodiment, the array elements should have an acceptance area that match the numerical aperture of the associated output faces of the waveguide. The linear photodiode array may comprise a number of diodes, for example 256, each of which may be optically coupled to the end of one of the cores. The photodiode array may have a serial output, in which the stored charge from each diode may be sequentially read out in a "bucket brigade" fashion according to a timing or clock pulse driving a shift register. The number of waveguides in the interface will depend on the size of the interface and the desired spatial resolution. If necessary, multiple linear diode arrays may be required to provide the outputs from all the waveguides of the interface. For example, if each waveguide comprises a 200 μm core surrounded on a side by 200 μm cladding, then 256 waveguides could provide 400 μm linear resolution over about 100 mm (about 4 inches).

Example 2

Mechanical Stress-Activated Interface System

An interface system comprising at least one mechanical stress-activated interface as disclosed in Example 1, above, may further include an electronic system comprising components capable of receiving, processing, and communicating the output signals of the photodiode array or arrays. For a single diode array, each "charge bucket" output, corresponding to the light sensed by a photodiode from a single waveguide, may first be amplified using a low-noise, low-leakage, amplifier to provide an amplified voltage proportional to the charge received from the diode.

Since the diode array produces a serial output according to a clock frequency driving the shift register, the amplifier output may be low-pass filtered to remove the clocking noise. For example, an active filter with a cut-off of about 50 KHz or less may be used for a shift register clock running at about 100 KHz.

The output of the low-pass filter may then be presented to an analog-to-digital converter (ADC) for digitization. It is understood that a reference voltage as well as sample-and-hold (S/H) electronics may be required for proper operation of the ADC. In some commercially available ADC circuits, both the reference voltage and S/H function may be incorporated into the device. The ADC may provide 16 bit resolution of the input voltage, the output being presented either as a serial stream of bits, or on a 16 bit parallel bus. The conversion clock for a serial ADC may run at a frequency that is sufficiently fast to properly sample and convert the output of the filter. For a diode array shift clock running at 100 KHz, the conversion clock of the ADC may run, for example, at about 20 MHz for proper sampling.

The ADC serial output may be presented to an interface for transmission to a computer or else to a microprocessor directly. Additional electronics, such as a counter coupled to the photodiode array shift register clock, may be required. The counter output may be provided to the computer or micro-processor to identify the waveguide being sampled by the ADC.

It is understood each interface may have its own set of electronics. However, the shift-register outputs of the diode arrays may be multiplexed into a single set of down-stream electronics or multiplexed for transmission to the computer or micro-processor.

Example 3

Method of Locating Mechanical Stress Applied to an Interface System

The interface of Example 1 and system of Example 2 may be used to detect the location of a finger pressing on the interface. An interface system comprising a pair of interfaces having their respective waveguides oriented at about 90 degrees to each other may be overlaid on a cell phone OLED display. Such a display may be about 100 mm (4 inches) on a side. The first interface may be oriented to resolve the location of mechanical pressure along an x direction, and the second interface may be oriented to resolve the location of the pressure in a y direction. Each interface may comprise 256 piezo-optical cores, each core optically coupled to one photo-diode of a 256 diode array. Each diode array may have a 100 KHz shift register clock, resulting in the complete set of 256 channels being read out in about 2.5 msec. Each interface may be read sequentially, resulting in about 5 msec. for the total interface to be polled. In order to properly convert the signal from each core ADC should sample at a rate greater than the diode array shift register clock, and thus the shift register clock may be rate limiting. In addition to the ADC output, the output of a counter or set of counters may be provided to the counter to identify the piezo-optical core being sampled by the ADC.

Each waveguide may comprise a piezo-optical core having a diameter or width of about 200 μm, surrounded on a side by about 200 μm cladding, thereby providing about 400 μm spatial resolution. An average human finger may be about 8 to 10 mm on a side. Therefore, when a user presses the interface, it is anticipated that more than one piezo-optical core in each of the x and y directions may be effected. The computer may continuously sample both the ADC output as well as the counter output to determine the amount of light propagating along the piezo-optical cores, as well as identify the core providing the ADC input. The computer may then use the ADC and counter outputs to enter light-related values into a data array, each member of the data array corresponding to a specific PO core. The data array may comprise all the data from all the PO cores, both in the x and y directions. Alternatively, separate arrays may be maintained for the x direction cores and the y direction cores.

The computer may maintain a record of previous values of the data array(s) to determine when a particular value changes in some significant way from previous values. A change may be recognized if the value of any array member exceeds a pre-set threshold value. The change may be verified if similar changes are detected in neighboring members of the data array, corresponding to multiple neighboring cores being affected by a finger touch.

Once the computer has determined that a stress has been applied, the computer may then analyze the data array(s) to localize the finger touch. Since there is variability in finger tip width, the number of cores affected by touch may vary from one person to a next. In addition, the amount of pressure produced by a finger tip may be distributed evenly or unevenly across the tip. The computer may analyze the data array(s) to find the data array member having the maximal value. The computer may then provide a coordinate value corresponding to the array member identified as having the maximal value to a receiving device.

Example 4

Method of Fabricating a Mechanical Stress Activated Interface

Initially, the substrate material may be provided as a thin film of PET (polyethylene terephthalate) on a roll. The core piezo-optical material may comprise copolymers vinylidene fluoride and trifluoroethylene (PVDF-TrFE), and may also be provided as a thin sheet on a roll. The sheet of PVDF-TrFE may then be laminated onto the PET substrate sheet under force between a pair of hot rollers.

The layer of core polymer on the laminate may then be singulated into discrete lines that make up the waveguides while keeping the substrate intact. An array of hot scribes, resembling a comb, may be forced against the core layer with accurate depth positioning so as not to disturb the substrate. The scribing may be performed against a metal roll or mandrel to cut parallel channels into the layer of core piezo-optical polymer, thereby forming long cores.

The cores may be poled so that an intrinsic electric dipole moment is set up within the molecular framework of the polymer. The laminated sheet comprising the core material on the substrate may be run through a thin chamber that is flushed with dry nitrogen. The chamber may be heated to a temperature from about 100° C. to about 250° C., which represents a range that will bring the core material to its glass transition temperature. The laminated sheet may then be run between, and in close proximity to, two parallel plate electrodes that produce an electric field that may range from about $10^2$ V/m to about $10^5$ V/m. This combination of temperature and electric field will pole the polymer to produce an intrinsic electric polarity. In this manner, the polymer waveguides will exhibit the piezo-optical effect.

After the waveguides are poled, the cladding material will be deposited over them in the form of a viscous resin. The cladding material may comprise a fluorinated epoxy polymer such as 2,2,3,3,3-pentafluoro methacrylate-co-glycidyl methacrylate. The viscous cladding resin will be doctor bladed or "squeegee-d" over the waveguide lines of the piezo-optical cores to insure the cladding material surrounds the cores without covering their top surfaces. The tacky resin may be cured in an oven section built into the fabrication system. Since adhesion of the cladding material to the core material may be an issue, an adhesion promoter such as aminopropyltrimethoxysilane may be sprayed or painted onto the core material of the laminate before the cladding material is added.

Sections of desired length of the final interface material may be cut out with a fine blade to produces a smooth finish on the cut surface. In this way the ends of the waveguides faces will be optically flat enough to provide good optical coupling to the light receiving elements such as a linear array of silicon photodiodes.

A two-dimensional touch screen may be fabricated by using a pair of interfaces oriented at about 90 degrees and affixed to each other.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated in this disclosure, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used in this disclosure is for the purpose of describing particular embodiments only, and is not intended to be limiting.

With respect to the use of substantially any plural and/or singular terms in this disclosure, those having skill in the art can translate from the plural to the singular and/or from the singular to the plural as is appropriate to the context and/or application. The various singular/plural permutations may be expressly set forth in this disclosure for sake of clarity.

It will be understood by those within the art that, in general, terms used in this disclosure, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed in this disclosure also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed in this disclosure can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, it will be appreciated that various embodiments of the present disclosure have been described for purposes of illustration, and that various modifications may be made without departing from the scope and spirit of the present disclosure. Accordingly, the various embodiments disclosed are not intended to be limiting, with the true scope and spirit being indicated by the following claims.

What is claimed is:

1. A mechanical stress activated interface device comprising:
    a flexible substrate;
    a plurality of waveguides associated with the flexible substrate, wherein each of the plurality of waveguides comprises:
        piezo-optical core having a first side, a second side, a face, at least an end and a transverse length, and
        a cladding component disposed against the first side of the piezo-optical core and extending essentially along the transverse length of the piezo-optical core; and
    a plurality of light receiving elements, each of the plurality of light receiving elements being optically coupled to at least the end of one of the piezo-optical cores,
    wherein each piezo-optical core has an unstressed core index of refraction, and a stressed core index of refraction, and wherein the unstressed core index of refraction is less than the stressed core index of refraction, and
    wherein a light ray impinging on an interface between an unstressed piezo-optical core and the flexible substrate has a first transverse propagation value along the transverse length of the piezo-optical core, wherein a light ray impinging on an interface between a stressed piezo-optical core and the flexible substrate has a second transverse propagation value along the transverse length of the piezo-optical core, and wherein the second transverse propagation value is greater than the first transverse propagation value.

2. The device of claim 1, wherein the second side of the piezo-optical core of a first waveguide of the plurality of waveguides is disposed against the cladding component of a second waveguide of the plurality of waveguides.

3. The device of claim 1, wherein the substrate has a substrate index of refraction that is less than each of the unstressed core index of refraction and the stressed core index of refraction.

4. The device of claim 1, wherein the cladding component has a cladding index of refraction that is less than each of the unstressed core index of refraction and the stressed core index of refraction.

5. The device of claim 1 further comprising at least one source of light configured to direct light rays towards the face of at least one piezo-optical core.

6. The device of claim 1 further comprising at least one light filter.

7. The device of claim 1, wherein the piezo-optical core of each of the plurality of waveguides has a glass transition temperature greater than or equal to an operating temperature of the plurality of waveguides.

8. A mechanical stress activated interface system comprising:
    a first mechanical stress activated interface device comprising,
        a first flexible substrate,
        a first plurality of waveguides associated with the first flexible substrate, wherein each of the first plurality of waveguides comprises:
            a piezo-optical core having a first side, a second side, a face, at least an end and a transverse length, and
            a cladding component disposed against the first side of the piezo-optical core and extending essentially along the transverse length of the piezo-optical core,
        a first plurality of light receiving elements, each of the first plurality of light receiving elements being optically coupled to at least the end of one of the piezo-optical cores of the first plurality of waveguides and providing a first light receiving element output; and
    an electronic system having an electronic system output, in data communication with each first light receiving element output of the first plurality of light receiving elements,
    wherein each piezo-optical core of the first plurality of waveguides has an unstressed core index of refraction, and a stressed core index of refraction, and wherein the unstressed core index of refraction is less than the stressed core index of refraction.

9. The system of claim 8, wherein the second side of the piezo-optical core of a first waveguide of the first plurality of waveguides is disposed against the cladding component of a second waveguide of the first plurality of waveguides.

10. The system of claim 8, wherein the first substrate has a first substrate index of refraction that is less than each of the unstressed core index of refraction of a piezo-optical core of the first plurality of waveguides and the stressed core index of refraction of a piezo-optical core of the first plurality of waveguides.

11. The system of claim 8, wherein the cladding component of each of the first plurality of waveguides has a cladding index of refraction that is less than each of the unstressed core index of refraction of a piezo-optical core of the first plurality of waveguides and the stressed core index of refraction of a piezo-optical core of the first plurality of waveguides.

12. The system of claim 8, wherein a light ray impinging on an interface between an unstressed piezo-optical core of the first plurality of waveguides and the first flexible substrate has a first transverse propagation value along the transverse length of the piezo-optical core, wherein a light ray impinging on an interface between a stressed piezo-optical core of the first plurality of waveguides and the first flexible substrate has a second transverse propagation value along the transverse length of the core, and wherein the second transverse propagation value is greater than the first transverse propagation value.

13. The system of claim 8, wherein the electronic system comprises at least one of an electronic signal amplifier, an electronic signal filter, an electronic signal threshold detection device, an analog-to-digital converter, a microprocessor, a dynamic memory system, a physical memory device configured to store instructions for the operation of the microprocessor, a signal output device, and a visual display device.

14. The system of claim 13, wherein the electronic system further comprises a communication system having at least one of a wired system, an optical cable system, a cable-less optical transmission system, and a wireless radiofrequency transmission system.

15. A method of locating a mechanical stress applied to an interface system, the method comprising:
providing a first flexible substrate;
providing a first plurality of waveguides associated with the first flexible substrate, wherein each of the first plurality of waveguides comprises:
a piezo-optical core having a first side, a second side, a face, at least an end and a transverse length, and
a cladding component disposed against the first side of the piezo-optical core and extending essentially along the transverse length of the piezo-optical core;
providing a first plurality of light receiving elements, each of the first plurality of light receiving elements being optically coupled to at least the end of one of the piezo-optical cores of the first plurality of waveguides and providing a first light receiving element output;
providing a second flexible substrate;
providing a second plurality of waveguides associated with the second flexible substrate, wherein each of the second plurality of waveguides comprises:
a piezo-optical core having a first side, a second side, a face, at least an end and a transverse length, and
a cladding component disposed against the first side of the piezo-optical core and extending essentially along the transverse length of the piezo-optical core;
providing a second plurality of light receiving elements, each of the second plurality of light receiving elements being optically coupled to at least the end of one of the piezo-optical cores of the second plurality of waveguides and providing a second light receiving element output;
providing a source of light rays to illuminate the interface system;
providing an electronic system having an electronic system output, in data communication with each first light receiving element output of the first plurality of light receiving elements, and each second light receiving element output of the second plurality of light receiving elements;
applying a stress input on the interface system; and
detecting a change in at least one light receiving element output of the first plurality of light receiving elements or in at least one light receiving element output of the second plurality of light receiving elements through the electronic system,
wherein each piezo-optical core of the first plurality of waveguides and each piezo-optical core of the second plurality of waveguides has an unstressed core index of refraction, and a stressed core index of refraction, and wherein the unstressed core index of refraction is less than the stressed core index of refraction, and
wherein the first plurality of waveguides is not oriented in a direction parallel with respect to the second plurality of waveguides.

16. The method of claim 15, wherein the stress input results from an activity of a human operator.

17. The method of claim 15, wherein detecting a change in at least one light receiving element output of the first plurality of light receiving elements or in at least one light receiving element output of the second plurality of light receiving elements through the electronic system, further comprises:
measuring a first unstressed light receiving element output from at least one light receiving element of the first plurality of light receiving elements at a first element first time;
measuring a second unstressed light receiving element output from at least one light receiving element of the second plurality of light receiving elements at a second element first time;
measuring a first stressed light receiving element output from at least one first light receiving element of the first plurality of light receiving elements at a first element second time;
measuring a second stressed light receiving element output from at least one light receiving element of the second plurality of light receiving elements at a second element second time;
subtracting the first unstressed light receiving element output from the first stressed light receiving element output, thereby computing a first difference; and
subtracting the second unstressed light receiving element output from the second stressed light receiving element output thereby computing a second difference.

18. The method of claim 17 further comprising:
subtracting a first threshold value from the first difference, thereby computing a first thresholded difference; and
subtracting a second threshold value from the second difference, thereby computing a second thresholded difference.

19. The method of claim 15, wherein detecting a change in at least one light receiving element output of the first plurality of light receiving elements or in at least one light receiving element output of the second plurality of light receiving elements through the electronic system, further comprises:
measuring a first light receiving element output from at least one light receiving element of the first plurality of light receiving elements;
measuring a second light receiving element output from at least one light receiving element of the second plurality of light receiving elements;
subtracting a first threshold value from the first light receiving element output, thereby computing a first thresholded output; and
subtracting a second threshold value from the second light receiving element output, thereby computing a second thresholded output.

20. The method of claim 15 further comprising;
transmitting the electronic system output to a receiving system.

21. A method of fabricating a mechanical stress activated interface system, the method comprising:
providing a first plurality of piezo-optical cores comprising a first piezo-optical material, wherein each of the first plurality of piezo-optical cores comprises at least a first side, a second side, a face, at least an end and a transverse length;
arranging the first plurality of piezo-optical cores into a first layer of piezo-optical cores, wherein no point of contact occurs between any of the first plurality of piezo-optical cores along their respective transverse lengths;
furnishing a first cladding component to the first layer of piezo-optical cores thereby forming a first piezo-optical waveguide layer, wherein the first cladding component encircles each of the first plurality of piezo-optical cores by forming a contact along the first side and the second side of each piezo-optical core of the first plurality of piezo-optical cores;

associating a first substrate layer comprising a first substrate material with the first piezo-optical waveguide layer thereby forming a first interface layer;

providing a first plurality of light receiving elements, wherein each light receiving element of the first plurality of light receiving elements is optically coupled to at least the end of one of the piezo-optical cores of the first plurality of piezo-optical cores, and each light receiving element of the first plurality of light receiving elements has a light receiving element output; and providing an electronic system configured to receive the light receiving element output of each of the first plurality of light receiving elements, wherein each piezo-optical core of the first plurality of piezo-optical cores has an unstressed core index of refraction, and a stressed core index of refraction, and wherein the unstressed core index of refraction is less than the stressed core index of refraction.

22. The method of claim 21, wherein providing a first plurality of piezo-optical cores comprises processing the first piezo-optical material into the first plurality of piezo-optical cores using at least one of thermal extrusion, casting and die cutting, die forming, spinning, pulling, calendering and dicing, stamping, embossing, and solution printing.

23. The method of claim 21, further comprising poling each of the first plurality of piezo-optical cores using at least two of heating the piezo-optical cores to about or above the softening temperature of the piezo-optical material, subjecting the piezo-optical cores to an electric field, mechanically stressing the piezo-optical cores, subjecting the piezo-optical cores to radiation, and subjecting the piezo-optical cores to a solvent.

24. The method of claim 21, further comprising curing the first cladding component.

25. The method of claim 21, further comprising coating each piezo-optical core of the first plurality of piezo-optical cores with a layer comprising an adhesion promoter.

26. The method of claim 21, wherein associating the first substrate layer with the first piezo-optical waveguide layer comprises:

heating the first substrate layer to a temperature about or above the softening point temperature of the first substrate material; and pressing the first piezo-optical waveguide layer onto the first substrate layer.

* * * * *

UNITED STATES PATENT AND TRADEMARK OFFICE
CERTIFICATE OF CORRECTION

| | | |
|---|---|---|
| PATENT NO. | : 8,526,770 B2 | Page 1 of 1 |
| APPLICATION NO. | : 13/503781 | |
| DATED | : September 3, 2013 | |
| INVENTOR(S) | : Casasanta | |

It is certified that error appears in the above-identified patent and that said Letters Patent is hereby corrected as shown below:

In the Specification

In Column 3, Line 28, delete "layer," and insert -- layer. --, therefor.

In Column 4, Line 64, delete "poly(vinylided fluoride)" and insert -- poly(vinylidene fluoride) --, therefor.

In Column 4, Line 65, delete "alphatic" and insert -- aliphatic --, therefor.

In Column 10, Line 57, delete "later (601)," and insert -- layer (601), --, therefor.

In the Claims

In Column 22, Line 47, in Claim 20, delete "comprising;" and insert -- comprising: --, therefor.

Signed and Sealed this
Eighth Day of April, 2014

Michelle K. Lee
*Deputy Director of the United States Patent and Trademark Office*